(12) United States Patent
Brenke et al.

(10) Patent No.: US 6,355,307 B1
(45) Date of Patent: Mar. 12, 2002

(54) TRANSPARENT COATING AGENTS AND THE USE THEREOF TO PRODUCE MULTI-LAYERED COATINGS

(75) Inventors: Stephan Brenke; Karl-Friedrich Dössel; Friedrich Herrmann, all of Wuppertal; Heinz-Walter Reifferscheidt, Bochum, all of (DE)

(73) Assignee: Dupont Performance Coatings GmbH & Co., Wuppertal (DE)

( * ) Notice: Subject to any disclaimer, the term of this patent is extended or adjusted under 35 U.S.C. 154(b) by 0 days.

(21) Appl. No.: 09/446,075

(22) PCT Filed: Jun. 9, 1998

(86) PCT No.: PCT/EP98/03463

§ 371 Date: Mar. 16, 2000

§ 102(e) Date: Mar. 16, 2000

(87) PCT Pub. No.: WO98/58029

PCT Pub. Date: Dec. 23, 1998

(30) Foreign Application Priority Data

Jun. 18, 1997 (DE) .......................................... 197 25 742

(51) Int. Cl.$^7$ .............................. B05D 1/36; B05D 3/02; B05D 7/16; C08F 8/30; C08L 75/06
(52) U.S. Cl. ................... 427/409; 427/388.2; 427/512; 427/559; 525/127; 525/128; 526/937
(58) Field of Search ................................ 525/127, 128, 525/932; 526/937; 427/388.2, 409, 559, 512

(56) References Cited

U.S. PATENT DOCUMENTS

| | | | |
|---|---|---|---|
| 3,919,351 A | * 11/1975 | Chang et al. ................ 525/127 |
| 4,096,291 A | * 6/1978 | Dunwald et al. ..... 427/388.2 X |
| 4,311,622 A | 1/1982 | Buter |
| 4,314,925 A | 2/1982 | Berazosky et al. |
| 4,322,508 A | * 3/1982 | Peng et al. .............. 525/128 X |
| 4,373,072 A | * 2/1983 | Patzschke et al. ...... 525/127 X |
| 4,495,229 A | * 1/1985 | Wolf et al. .............. 427/388.2 |
| 4,677,028 A | 6/1987 | Heeringa et al. ......... 428/422.8 |
| 4,720,523 A | * 1/1988 | Dickie et al. ................ 525/113 |
| 4,906,692 A | * 3/1990 | Plum et al. .................. 525/127 |
| 5,466,860 A | 11/1995 | Flosbach et al. .............. 560/43 |
| 5,580,660 A | * 12/1996 | Witte et al. .......... 427/388.2 X |
| 5,593,735 A | * 1/1997 | Wu et al. ................ 525/127 X |
| 5,977,245 A | * 11/1999 | Shah et al. ............. 525/127 X |
| 6,013,326 A | * 1/2000 | Flosbach et al. ........ 525/127 X |

FOREIGN PATENT DOCUMENTS

| | | |
|---|---|---|
| DE | 43 10 413 A1 | 10/1994 |
| EP | 192 304 A1 | 8/1986 |
| EP | 198 519 A1 | 10/1986 |
| EP | 0 653 468 A2 | 5/1995 |

* cited by examiner

Primary Examiner—Richard D. Lovering
(74) Attorney, Agent, or Firm—Pillsbury Winthrop LLP

(57) ABSTRACT

Clear lacquer coating media suitable for multi-layer coatings, containing self-crosslinking or externally crosslinkable binder vehicles, organic solvents, and in the case of externally-crosslinkable binder vehicles containing one or more crosslinking agents which are different from aldehyde condensation resins, and optionally also containing one or more reactive thinners and customary additives for clear lacquers, with an additional content of A) 0.1 to 3% by weight one or more urea compounds, and
B) 0.05 to 10% by weight one or more substances which supply formaldehyde, with respect in each case to the resin solids content which is formed by the binder vehicles, reactive thinners and crosslinking agents.

12 Claims, No Drawings

TRANSPARENT COATING AGENTS AND THE USE THEREOF TO PRODUCE MULTI-LAYERED COATINGS

This application is a 371 of PCT/EP98/03463 filed Jun. 9, 1998.

This invention relates to clear stoving lacquer coating media, to the use thereof for the production of multi-layer coatings, particularly multi-layer coatings of the base lacquer/clear lacquer type, and to a method of producing multi-layer coatings.

Current mass-production lacquer coatings for automobiles mostly consist of a base lacquer/covering lacquer coating which is applied to a pre-coated automobile body. The clear stoving lacquers which have been used in particular in practice are those which comprise a binder vehicle-crosslinking agent system based on a combination of hydroxy-functional binder vehicles and aminoplastic resins. In clear stoving lacquers such as these, the hydroxy-functional binder vehicles and the aminoplastic crosslinking agents are generally present in a solids content ratio of 50:50 to 90:10. Clear lacquer coats produced from clear lacquers such as these do not exhibit satisfactory resistance to acids. When there are increased demands on the acid-resistance of clear lacquer coats, the use of clear lacquer systems which have other crosslinking mechanisms is preferred, for example the use of clear lacquer systems such as these which crosslink with the formation of urethane groups or ester groups or with the formation of a C—C bond.

The visual and aesthetic impression of base lacquer/clear lacquer two-layer coatings is significantly influenced by the quality of the clear lacquer coat. In the ideal situation, the structure of the clear lacquer coat is identical on horizontal and vertical surfaces of a three-dimensional substrate, of an automobile body for example. In practice, however, the ideal situation described above cannot be achieved without difficulty. For example, differences may occur in the surface structure or in the flow of the outer clear lacquer coat, since after their application, and particularly during the heat-up phase of the stoving process, clear lacquers tend to run off or sag on surfaces which depart from the horizontal as a result of a decrease in viscosity due to temperature. This risk is greater, the greater is the clear lacquer coat thickness.

It is known from DE-C 27 51 761 and EP-A-0 198 519 that certain urea compounds can be used as additives in clear stoving lacquers which contain aminoplastic resins as crosslinking agents, in order to counteract unwanted run-off phenomena of the clear lacquer. In addition, it is known from EP-A-0 192 304 that urea compounds can be used as anti-runoff agents in clear lacquers which contain hydroxy-functional binder vehicles and crosslinking agents which are different from aminoplastic resins. Within the scope of the present invention, it has been shown that the use of urea compounds in clear lacquers results in reduced brilliance and in dullness (milkiness) of stoved clear lacquer coats. The dullness phenomenon becomes particularly pronounced when clear lacquer coats are formed on dark backgrounds, for example on base lacquer coats of a dark hue.

The object of the present, invention is to provide clear lacquer coating media which are substantially free from aldehyde condensation resin crosslinking agents, which exhibit a reduced tendency to run-off, and which can be hardened to form non-dulled, brilliant, acid-resistant clear lacquer coats.

This object is achieved by clear lacquer coating media containing one or more self-crosslinking or externally crosslinkable binder vehicles, one or more organic solvents, in the case of externally-crosslinkable binder vehicles containing one or more crosslinking agents which are different from aldehyde condensation resins, optionally also containing one or more reactive thinners, and optionally also containing customary additives for clear lacquers, which are characterised by an additional content of A) 0.1 to 3% by weight one or more urea compounds, and
B) 0.05 to 10% by weight one or more substances which supply formaldehyde, with respect in each case to the resin solids content of the clear lacquer coating medium which is formed by the binder vehicles and by the reactive thinners which are optionally present and by the crosslinking agents which are optionally present.

The clear lacquer coating media according to the invention are thermally hardenable, and are what are termed clear stoving lacquer coating media, which harden at temperatures of 80° C. and above, e.g. up to 160° C.

In the clear lacquer coating media according to the invention, the resin solids content is composed of a binder vehicle which can be thermally hardened by addition or condensation reactions, optionally plus a reactive thinner system, optionally plus a crosslinking agent system, which crosslinks chemically during stoving with the formation of covalent bonds. Binder vehicle systems which are thermally hardenable by addition and/or condensation reactions are binder vehicles which are optionally admixed with reactive thinners (compounds which are chemically incorporated in the lacquer film during stoving) and are optionally admixed with crosslinking agents for clear lacquer coating media, preferably for clear lacquer coating media such as those which can be used for the production of base lacquer/clear lacquer two-layer coatings, and which are known from a multiplicity of patent documents, for example.

The clear lacquer coating media according to the invention are liquid. They contain organic solvents and one or more customary film-forming binder vehicles; they optionally contain one or more reactive thinners in addition, as well as one or more crosslinking agents if the binder vehicles are not self-crosslinking. In principle, neither the binder vehicles nor the crosslinking agents are subject to any restriction, although systems in which a significant proportion of the chemical crosslinking occurs due to aldehyde condensation resins are excluded, i.e. the clear lacquer coating media according to the invention are substantially or completely free from aldehyde condensation resins. In particular, the clear lacquer coating media according to the invention contain, with respect to their resin solids content, less than 5, preferably less than 3, most preferably less than 1, for example 0 to 1% by weight of aldehyde condensation resins. Particular examples of aldehyde condensation resins such as these include the partially or completely alkylated aldehyde condensation resins which are customary in lacquer technology as crosslinking agents for hydroxy-functional binder vehicles, for example phenol-(form) aldehyde condensation resins or aminoplastic resins such as urea-(form)aldehyde or amine-(form)aldehyde condensation resins (e.g. melamine resins, benzoguanamine resins).

The clear lacquer coating media according to the invention are preferably externally-crosslinkable systems, in which binder vehicles are present which optionally contain reactive thinners and crosslinking agents, generally in a stoichiometric ratio, which is matched to the sought-after degree of crosslinking, of 50 to 90% by weight binder vehicles, 0 to 20% by weight reactive thinners and 50 to 10% by weight crosslinking agents, wherein the sum amounts to 100%. In principle, neither the binder vehicles nor the reactive thinners are subject to any restriction.

There is also no restriction on the selection of the crosslinking agents which are optionally contained. This depends on the functionality of the binder vehicles, i.e. the crosslinking agents are selected so that they have a reactive functionality which is complementary to the functionality of the binder vehicles. In this respect, the use of aldehyde condensation resins as crosslinking agents is substantially or completely avoided, as stated above. Polyester, polyurethane and/or (meth)acrylic copolymer resins can be used as film-forming binder vehicles, for example. The binder vehicles, particularly polyester and polyurethane resins, are preferably substantially free from aromatic structural units and are based on aliphatic and/or cycloaliphatic components. The (meth)acrylic copolymer resins may contain aromatic structural units, for example in the form of styrene which is incorporated by polymerisation. The functional groups of the self-crosslinking system or of the preferred externally crosslinkable system can react with each other thermally with addition and/or condensation. Examples of addition reactions which are suitable for crosslinking the systems include the ring-opening addition of an epoxide group to a carboxyl group with the formation of an ester group and a hydroxyl group, the addition of a hydroxyl group to an isocyanate group with the formation of a urethane group, and the Michael addition of an acidic CH group to a (meth)acryloyl group with C—C bonding.

Examples of condensation reactions which are suitable for crosslinking include the reaction of a hydroxyl group with a blocked isocyanate group with the formation of a urethane group and separation of the blocking agent, the transesterification reaction of a hydroxyl group with an ester group with separation of the esterification alcohol, and the transurethanisation reaction of a hydroxyl group with a carbamate group with the separation of alcohol. Provided that they are compatible with each other, a plurality of functionalities can also exist jointly in a system which hardens thermally by addition or condensation reactions, so that two or more different types of reactions of those cited above by way of example can occur during stoving. The crosslinking agents which are used in externally crosslinking clear lacquer systems may be present individually or in admixture.

The clear lacquer coating media according to the invention are preferably externally crosslinkable clear lacquer coating media based on hydroxy-functional binder vehicles. They can be single-component clear lacquer coating media, but are preferably two-component clear lacquer coating media.

The preferred single-component clear lacquer coating media according to the invention are those which contain, as binder vehicles, hydroxy-functional (meth)acrylic copolymers, polyester resins and/or polyurethane resins, individually or in admixture, and which optionally contain hydroxy-functional reactive thinners in addition. Components based on triazine and/or transesterification crosslinking agents which react with the hydroxyl groups of the hydroxy-functional binders and with the hydroxy-functional reactive tinners which are optionally contained, under formation of ester groups and/or blocked polyisocyanates are preferably contained as crosslinking agents.

The preferred two-component clear lacquers according to the invention are those which contain, as their binder vehicle component, hydroxy-functional (meth)acrylic copolymers, polyester resins and/or polyurethane resins, individually or in admixture, and which optionally contain hydroxy-functional reactive thinners in addition, and which contain free polyisocyanates as the crosslinking component.

The binder vehicles preferably have a number average molecular weight (Mn) of 500 to 10,000 and a hydroxyl number of 30 to 450 mg KOH/g. Examples of hydroxy-functional polyester resins which are preferably used in the clear lacquer coating media according to the invention include customary polyester resins, for example those with a number average molecular weight (Mn) of 500 to 5000, preferably of 1000 to 3000, and hydroxyl numbers of 30 to 450, preferably 50 to 280 mg KOH/g.

Examples of hydroxy-functional polyurethane resins which are preferably used in the clear lacquer coating media according to the invention include customary polyurethane resins, for example those with a number average molecular weight (Mn) of 500 to 5000, preferably of 1000 to 3000, and hydroxyl numbers of 30 to 450, preferably 50 to 280 mg KOH/g.

Examples of hydroxy-functional (meth)acrylic copolymers which can be used as preferred binder vehicles in the clear lacquer coating media according to the invention include customary (meth)acrylic copolymers with a number average molecular weight (Mn) between 1000 and 10,000 and hydroxyl numbers of 30 to 300, preferably 50 to 250 mg KOH/g. These (meth)acrylic copolymers may for example have been produced in the presence of oligomeric or polymeric polyester and/or polyurethane resins, for example those listed in the two preceding paragraphs.

Examples of liquid hydroxy-functional reactive thinners which can be used in the clear lacquer coating media according to the invention include low molecular weight compounds containing at least two hydroxyl groups per molecule and hydroxyl numbers within the range from 250 to 700 mg KOH/g. Oligomeric or polymeric polyols are suitable, such as polyether polyols, oligoester polyols, polycarbonate polyols and oligourethane polyols. Commercial products are suitable, for example, such as polycaprolactone polyols which can be obtained by the reaction of polyols with caprolactone, polyether polyols e.g. triethylene glycol which can be obtained by the reaction of oxirane compounds with polyols and/or water, or oligourethane polyols which can be obtained by the reaction of polyamines with cyclic carbonates.

Examples of polyisocyanates which can be used in free or blocked form in the clear lacquer coating media according to the invention as crosslinking agents for hydroxy-functional binder vehicles, plus optionally reactive thinners, include cycloaliphatic or aliphatic diisocyanates such as tetramethylene diisocyanate, 1,6-hexamethylene diisocyanate, 1,12-dodecane diisocyanate, cyclohexane 1,3- and 1,4-diisocyanate, isophorone diisocyanate, biscyclohexylmethane diisocyanate or mixtures thereof.

Apart from these simple isocyanates, others which contain hetero atoms in the radical linking the isocyanate groups are also suitable. Examples thereof include polyisocyanates containing carbodiimide groups, allophanate groups, isocyanurate groups, uretdione groups, urethane groups, acylated urea groups and/or biuret groups.

The known polyisocyanates which are customarily used in the production of lacquers are particularly suitable, e.g. modification products of the aforementioned simple isocyanates which contain biuret, isocyanurate or urethane groups, particularly tris-(6-isocyanatohexyl)-biuret, the isocyanurate derived from isophorone diisocyanate or 1hexane diisocyanate, or low molecular weight polyisocyanates comprising urethane groups, such as those which can be obtained by the reaction of isophorone diisocyanate, which is used in excess, with simple polyhydric alcohols of molecular weight range 62 to 300, particularly with trimethylolpropane. Any mixtures of said polyisocyanates can also of course be used.

Other suitable polyisocyanates include the known prepolymers which contain terminal isocyanate groups, such as those which can be obtained in particular by the reaction of the aforementioned simple polyisocyanates, primarily diisocyanates, with substoichiometric amounts of organic compounds which contain at least two groups capable of reacting with isocyanate groups.

Customary blocking agents, which split off under the reaction conditions during the crosslinking of the binder vehicles and hardeners, are suitable as blocking agents for the polyisocyanate crosslinking agents described above. Examples include customary acidic CH blocking agents, or NH-, SH- or OH-functional blocking agents. These can be used on their own or in admixture for blocking. Examples include acidic CH compounds such as acetylacetone, or acidic CH esters, such as allyl esters of acetoacetic acid, dialkyl esters of malonic acid; aliphatic or cycloaliphatic alcohols; such as n-butanol, isopropanol, tert.-butanol, furfurol, 2-ethylhexanol or cyclohexanol; oximes such as methyl ethyl ketoxime, acetone oxime, cyclohexanone oxime or acetophenone oxime, lactams such as epsilon-caprolactam or pyrrolidone-2, imidazoles such as 2-methylimidazole, and pyrazoles such as 2,3-dimethylpyrazole. Acidic CH esters and/or oximes are preferred as blocking agents.

Examples of components based on triazine which crosslink in the clear lacquer coating media according to the invention with hydroxy-functional binder vehicles, and with reactive thinners which are optionally contained in addition, with the formation of ester groups, particularly with the formation of urethane groups (carbamic acid ester groups), include customary transesterification crosslinking agents, such as tris(alkoxycarbonylamino)triazine for example, which is preferred.

The clear lacquer coating media according to the invention which are particularly preferred are those in which the resin solids consist of an externally crosslinkable system which contains hydroxy-functional binder vehicles, particularly those based on (meth)acrylic copolymers, and free polyisocyanate as a crosslinking agents.

In the state in which they are capable of being applied as coatings, the clear lacquer coating media according to the invention have a solids content, which is formed from the resin solids and from other non-volatile constituents, of 40 to 70% by weight. The volatile constituents which they contain are organic solvents, such as glycol ethers, e.g. butyl glycol, dipropylene glycol dimethyl ether, dipropylene glycol monomethyl ether or ethylene glycol dimethyl ether; glycol ether esters such as ethyl glycol acetate, butyl glycol acetate, 3-methoxy-n-butyl acetate, butyl diglycol acetate or methoxypropyl acetate; esters such as butyl acetate, isobutyl acetate or amyl acetate; ketones such as methyl ethyl ketone, methyl isobutyl ketone, diisobutyl ketone, cyclohexanone or isophorone; alcohols such as methanol, ethanol, propanol or butanol; aromatic hydrocarbons such as xylene, Solvesso 100 (Registered Trade Mark for a mixture of aromatic hydrocarbons with a boiling range of 155 to 185° C.) and aliphatic hydrocarbons.

The clear lacquer coating media according to the invention contain, with respect to their resin solids content, 0.1 to 3, preferably 0.3 to 2, most preferably 0.5 to 1.5% by weight, of one or more urea compounds (A) as anti-runoff agents, i.e. as agents which have a thixotropic effect or which influence the intrinsic viscosity and which have a favourable effect on the runoff behaviour of the clear lacquer coating media. They effectively prevent the unwanted runoff or sagging of clear lacquer coats which are produced from the clear lacquer coating media according to the invention and which are applied to vertical surfaces.

Examples of urea compounds (A) include the urea compounds which are known as anti-runoff agents from DE-C-27 51 761, EP-A-0 192 304 and EP-A-0 198 519 and which can be used in clear stoving lacquers. For clear stoving lacquers, the runoff problem is particularly apparent during the stoving process, on account of the initial decrease in viscosity due to the temperatures employed.

Urea compounds (A) are addition products of aromatic, araliphatic, cycloaliphatic or aliphatic diisocyanates and/or polyisocyanates derived therefrom (for example those of the isocyanurate type) and mono- and/or polyamines which contain primary and/or secondary amino groups. These addition products may be defined low molecular weight compounds or oligomeric or polymeric addition products. The preferred urea compounds (A) are those in which a polyisocyanate and an amine have been reacted in a stoichiometric ratio of 0.7–1.5 primary and/or secondary amino groups per isocyanate group, most preferably in a stoichiometric ratio of amino groups to isocyanate groups of 1:1. Addition products of diisocyanates, preferably of aliphatic or cycloaliphatic diisocyanates, and primary amines, preferably primary monoamines, are most preferably used as urea compounds (A). The aliphatic or aromatic diisocyanates are preferably diisocyanates which have been synthesised with a symmetrical structure.

Urea compounds (A) which are used in the clear lacquer coating media according to the invention are preferably selected so that they are solid, most preferably crystalline substances, since these are particularly effective as anti-runoff agents. The particle size of the (A) particles is preferably 0.1 to 20 $\mu$m. These solid or crystalline urea compounds (A) preferably have a high solidification or melting point, which in particular is above the stoving temperatures which prevail during the stoving of the clear lacquer coating media according to the invention, particularly above 80° C., for example between 80 and 250° C. The addition product formed from 1 mole of 1,6-hexane diisocyanate and 2 moles of benzylamine is most preferably used as urea compound (A) in the clear lacquer coating media according to the invention.

Urea compounds (A) can be produced in the usual manner by the addition of amines, which contain primary and/or secondary amino groups, to polyisocyanates. In the course of this procedure, the amine can be added to the polyisocyanate or the polyisocyanate can be added to the amine, or the reactants are added simultaneously. The addition of the polyisocyanate to the amine is preferred. Production is effected, for example, at temperatures between 20 and 80° C., for example in bulk and in the absence of solvent, but preferably in an inert solvent or most preferably in the presence of binder vehicles or crosslinking agents which are inert under the reaction conditions, for example in the presence of a solution of an inert binder vehicle or crosslinking agent. Good, intensive mixing of the reaction system is advisable in the course of this procedure, by vigorous stirring for example. If production is effected corresponding to the most preferred procedure, namely in the presence of an inert binder vehicle or crosslinking agent, it may be effected in the presence of part or all of the binder vehicles or crosslinking agents which are present in the clear lacquer coating media. If the clear lacquer coating medium contains more than one binder vehicle or more than one crosslinking agent, production can be effected, for example, in one of these binder vehicles or in one of these crosslinking agents. It is essential that the binder vehicles or crosslinking agents which are used as the reaction medium for the production of urea compounds (A) are inert with respect to the reactants, i.e. that under the prevailing reaction conditions they preferably react neither with the amine nor with the polyisocyanate, or that their reactivity in relation to these reactants is so slight that the reactants practically only react with each other, and therefore react completely to form the desired urea compound (A). A procedure is preferably employed in which the urea compounds (A) which are formed are precipitated or crystallise out as a finely divided solid in the binder vehicle or binder vehicle solution or in the crosslinking agent or crosslinking agent solution, for example during or after completion of the addition reaction, and during or after cooling for example. Dispersions such as these, comprising urea compounds (A) which are present as a finely divided solid, preferably as a crystalline solid, in the binder vehicle (solution) or crosslinking agent (solution), can also be prepared by melting and finely distributing urea compounds (A) in the binder vehicle (solution) or crosslinking agent (solution), and subsequently cooling below the solidification or melting point of urea compounds (A). This procedure is particularly suitable if binder vehicles (binder vehicle solutions) or crosslinking agents (cross-linking agent solutions) are used which are not inert in the sense explained above.

Production of the clear lacquer coating media is preferably effected by mixing urea compounds (A), preferably as a preparation, for example as a dispersion in a solvent or most preferably as a dispersion in part of the liquid or dissolved binder vehicle or crosslinking agent, with the remaining constituents of the clear lacquer coating medium. For example, mixing can first of all be effected with the remaining binder vehicles before the other constituents are admixed. If the clear lacquer coating media according to the invention contain more than one binder vehicle, it is possible for urea compounds (A) to be present in a binder vehicle, the functional groups of which differ from the functional groups of the further binder vehicle or binder vehicles which are to be mixed therewith. However, if the clear lacquer coating media according to the invention do contain more than one binder vehicle, it is preferred that the functional groups of the binder vehicles are the same.

Further details on urea compounds (A) which can be used in the clear lacquer coating media according to the invention, on the starting materials, and on the process and process parameters for producing urea compounds (A) and the incorporation thereof in coating media, are to be found in DE-C-27 51 761, EP-A-0 192 304 and EP-A-0 198 519, to which reference is made, expressly but not exclusively, here.

The clear lacquer coating media according to the invention contain, with respect to their resin solids content, 0.05 to 10% by weight of one or more substances (B) which supply formaldehyde, wherein the upper limit is preferably 5 or 3 and the lower limit is preferably 0.1% by weight. At the latest, these substances release formaldehyde during the stoving of clear lacquer coats produced from the clear lacquer coating media. In this respect, it is particularly preferred that the clear lacquer coating media according to the invention contain, with respect to their content of component (A), 10 to 1000, preferably 30 to 500% by weight of one or more substances (B) such as these. Surprisingly, the object of the invention is achieved if the clear lacquer coating media according to the invention only contain small amounts of substances (B) which supply formaldehyde. This is surprising for two reasons. Firstly, it is not known whether the yield is achieved which is theoretically possible for the supply of formaldehyde from (B). Secondly, it is particularly surprising that the small amounts of substances (B) which supply formaldehyde in the clear lacquer coating media according to the invention are sufficient, since a large proportion of the formaldehyde supplied can escape as gas on account of the large surface area of clear lacquer coats applied from the clear lacquer coating media according to the invention.

Substances (B) which at the latest supply formaldehyde during the stoving of clear lacquer coats produced from the clear lacquer coating media are defined, low molecular weight, oligomeric or polymeric compounds, which are suitable, under the conditions prevailing before or after application of the clear lacquer coating media according to the invention or at the latest during the stoving of clear lacquer coats produced from the clear lacquer coating media according to the invention, for supplying formaldehyde. They preferably do not supply formaldehyde until stoving is effected, i.e. under or during the conditions prevailing during stoving. The supply of formaldehyde from substances (B) under the conditions prevailing before or after application of the clear lacquer coating media according to the invention, or at the latest during the stoving of clear lacquer coats produced from the clear lacquer coating media according to the invention, means that substances (B) contain free formaldehyde as such, as an impurity for example, or that formaldehyde is then released or that formaldehyde is then released from reaction products which were formed previously from (B) and from other constituents of the clear lacquer coating media according to the invention or which have been formed by hydrolysis of (B). If (B) contains free formaldehyde, the content of free formaldehyde is less than 1% by weight with respect to (B). Substances (B3) which supply formaldehyde may be present in dissolved or finely dispersed form in the clear lacquer coating media according to the invention.

Substances (B) preferably only supply formaldehyde at elevated temperatures, and in particular only at the temperatures prevailing during the stoving of clear lacquer coats produced from the clear lacquer coating media according to the invention. In this respect, substances (B) may release formaldehyde as such or they release formaldehyde on reaction with further constituents of the clear lacquer coating media according to the invention or on reaction with water due to hydrolysis. Water can occur in the form of atmospheric moisture, or as traces of water from the clear lacquer coating medium according to the invention, or can originate from lacquer coats which were applied previously and which are located under the clear lacquer coat. Intermediate products may also first be formed, from which formaldehyde is subsequently released. It may be advantageously to catalyse the reactions which ultimately result in the release of formaldehyde. Acids in particular are examples of substances with a catalytic action. These acids may be acidic groups of the binder vehicles or crosslinking agents, or they may be acids which are specially added to the clear lacquer coating media according to the invention, for example acid catalysts which are customary for lacquers, such as phosphoric acid, acidic organophosphates or aromatic sulphonic acids in particular. As a rule, particularly when strong acids are used, the acid catalysts are added in blocked form, for example blocked with an amine. The acid can be released thermally again therefrom.

Substances (B) can be used in the clear lacquer coating media according to the invention on their own or in admixture, and can optionally also be used as a special preparation prepared beforehand, for example in admixture with other substances which are not suppliers of formaldehyde. In particular, substances (B) are compounds which contain one or more formal or hemiformal structural units, or which contain structural units comprising aminal derived from formaldehyde or semi-aminal derived from formaldehyde, wherein these structural units may be constituents of heterocyclic ring systems. Examples of substances comprising structural units of this type include paraformaldehyde, polyoxymethylene glycols, urotropin, 1,3-oxazolidines which are unsubstituted in the 2-position, 1,3-dioxolanes which are unsubstituted in the 2-position, addition products of alcohols with formaldehyde, such as glycerol formal, benzyl alcohol monohemiformal or benzyl alcohol polyhemiformal, compounds which contain N-methylol groups, compounds which contain N-methylol ether groups, and (meth)acrylic copolymers which contain N-methylol groups and/or N-methylol ether groups. Partially or completely alkylated formaldehyde condensation resins can also be used, such as those which are customary in lacquer technology as crosslinking agents for hydroxyfunctional binder vehicles, for example phenol-formaldehyde condensation resins or aminoplastic resins such as urea-formaldehyde or amine-formaldehyde condensation resins, e.g. melamine resins or benzoguanamine resins. These are used in particular in an amount of less than 5% by weight with respect to the resin solids content of the clear lacquer coating media.

In addition, the clear lacquer coating media according to the invention may contain, in addition to urea compounds (A), customary lacquer additives in the amounts which are usual for lacquers, for example up to 5% by weight with respect to the lacquer as a whole, e.g. transparent pigments or extenders, flow enhancers, colorants, light stabilisers, antioxidants, or other rheology controlling agents such as microgels or NAD (=non-aqueous dispersions).

The clear lacquer coating media according to the invention can be used for producing the outer lacquer coat of a multi-layer coating. In this respect, the present invention also relates to the use of the clear lacquer coating media according to the invention. For example, the clear lacquer coating medium according to the invention can be applied to a substrate which is provided with a colour- and/or effect-imparting preliminary coating and can then be stoved. The stoving temperatures of the clear lacquer coating media according to the invention are between 60 and 160° C., for example. For automobile applications these temperatures are between 60 and 140, and for applications in the mass production coating of automobiles they are between 80 and 140 in particular, and are preferably between 110 and 130° C.

The present invention further relates to a method of producing a multi-layer coating by the application and stoving of a clear lacquer coating layer of a clear lacquer coating medium according to the invention to a substrate which is provided with a colour- and/or effect-imparting, single- or multi-layer preliminary coating.

This is preferably a method of producing a base lacquer/clear lacquer multi-layer coating by the application and stoving of a clear lacquer coating layer of a clear lacquer coating medium according to the invention to a substrate which is provided with a colour- and/or effect-imparting base lacquer coat. In this respect, a colour-and/or effect-imparting base lacquer coat is applied to a substrate, which is optionally pre-coated, and is applied in particular to pre-coated automobile bodies or parts thereof. Examples of preliminary coatings on automobile bodies or parts thereof include an electro-dip primer coat, a two-layer preliminary coating consisting of an electro-dip primer coat and a primer surfacer spray coat, or a two-layer preliminary coating consisting of an electro-dip primer coat and a second coating layer which is deposited electrophoretically.

The colour- and/or effect-imparting base lacquer coat can be stoved before the application of the clear lacquer coat of the clear lacquer coating medium according to the invention. However, the clear lacquer coating medium according to the invention is preferably applied by the known wet-into-wet method to the base lacquer coat which determines the colour of the multi-layer coating. In this procedure, the base lacquer coat is applied by spraying from a colour- and/or effect-imparting aqueous or solvent-based base lacquer to give a dry coat thickness which depends on the colour shade, for example between 10 and 25 $\mu$m. Application of the base lacquer coat is followed by a brief ventilation phase in air, e.g. at 20 to 80° C.; this is then followed by the application by spraying of the clear lacquer coat of the clear lacquer coating medium according to the invention, to a give a dry coat thickness which is generally between 25 and 50 $\mu$m. A brief ventilation phase in air may optionally also be employed here. It is often advisable and preferred to assist ventilation in air by heating, preferably with the aid of infrared radiation for example. Thereafter, the substrate is fed to the stoving operation in which the clear lacquer coating layer is stoved together with the base lacquer coat at elevated temperatures, from 80 to 160° C., for example.

The present invention enables multi-layer coatings to be produced, particularly base lacquer/clear lacquer two-layer coatings, on motor vehicles and parts thereof in particular, which exhibit an outstanding visual and aesthetic impression and good resistance to acids. Runoff of the clear lacquer on vertical surfaces, particularly during stoving, is effectively prevented. Clear lacquer coats produced from the clear stoving lacquers according to the invention are brilliant and free from dulling.

Production of multi-layer coating

COMPARATIVE EXAMPLE A

A stock lacquer with the following composition was first produced in the usual manner by mixing an acrylate resin solution with additives and solvents:

42 parts of a solid acrylate resin (hydroxyl number 140 mg KOH/g)

1 part of a light stabiliser (a benztriazole derivative)

1 part of a light stabiliser (a HALS derivative; HALS= hindered amine light stabiliser)

0.2 parts of a commercially available silicone oil as a flow enhancer (calculated as the active ingredient)

55.8 parts of a mixture of organic solvents.

A clear lacquer was produced by mixing 100 parts of the stock lacquer with 30 parts of a hardener solution consisting of 24.6 parts triisocyanate (hexamethylene diisocyanate-isocyuranate) and 5.4 parts of butyl acetate.

A black, single-colour aqueous base lacquer was sprayed, to give a dry coat thickness of 16 $\mu$m, on to a metal sheet which was provided with a cataphoretic primer coat and a primer surfacer coat, and was pre-dried for 10 minutes at 80° C. The clear lacquer described above was then sprayed in the form of a wedge on to the suspended metal sheet to give a coat thickness gradient corresponding to a dry coat thickness from 10 to 70 $\mu$m. After a 10 minute ventilation phase in air at room temperature, the specimen was stoved for 20 minutes at 140° C. (object temperature). The metal sheet was in a vertical position in all these operations.

COMPARATIVE EXAMPLE B

A stock lacquer containing the same weight of solids as in comparative example A was first prepared. As distinct from comparative example A, part of the acrylate resin solution which was employed here was replaced by a modified acrylic resin solution. The modified acrylic resin solution contained a diurea derivative which was suspended therein in solid form.

Composition of the stock lacquer 31 parts of the solid acrylate resin from comparative example A (hydroxyl number 140 mg KOH/g)

10.3 parts of a further solid acrylate resin (hydroxyl number 140 mg KOH/g)

0.7 parts of a diurea derivative (an addition product of 2 moles benzylamine to 1 mole hexamethylene diisocyanate)

1 part of a light stabiliser (a benztriazole derivative)

1 part of a light stabiliser (a HALS derivative; HALS hindered amine light stabiliser)

0.2 parts of the same silicone oil as in comparative example A (calculated as the active ingredient)

55.8 parts of a mixture of organic solvents as in comparative example A.

The clear lacquer was prepared and the multi-layer coating was produced analogously to comparative example A Example 1 (example according to the invention)

As distinct from comparative example B, 130 parts of the clear lacquer were mixed, before application, with one part of Maprenal MF 590 (a 55% by weight solution of a melamine resins, isobutylated, manufactured by Vianova Resins) and 0.3 parts of Nacure 5225 (a blocked aromatic sulphonic acid manufactured by King Industries). The content of melamine resin with respect to the resin solids content was 0.8% by weight. The content of urea was 1.0% by weight with respect to the resin solids content.

Example 2 (example according to the invention)

As distinct from comparative example B, 130 parts of the clear lacquer were mixed before application with one part of Preventol D2 (benzyl hemiformal; manufactured by Bayer) and with 0.3 parts of Nacure 5225. The content of benzyl hemiformal was 1.5% by weight with respect to the resin solids content. The content of urea was 1.0% by weight with respect to the resin solids content.

The resistance to sulphuric acid of the coatings obtained in comparative tests A and B and in examples 1 and 2 was satisfactory, and there was no difference between these values. The differences between the multi-layer coatings obtained are shown in Table 1.

TABLE 1

| | |
|---|---|
| Comparison A | 35 μm clear lacquer run limit |
| Comparison B | 45 μm clear lacquer run limit, clearly visible haze, milky |
| Example 1 according to the invention | 50 μm clear lacquer run limit, clear, brilliant |
| Example 2 according to the invention | 47 μm clear lacquer run limit, clear, brilliant |

What is claimed is:

1. A method for making clear lacquer coating media comprising:
    adding
        A) 0.1 to 3% by weight of one or more urea compounds, and
        B) 0.05 to 10% by weight of one or more substances which supply formaldehyde as additives for clear lacquer coating media,
    wherein the clear lacquer coating media contain one or more self-crosslinking or externally crosslinking binder vehicles, one or more organic solvents, and wherein the externally-crosslinkable binder vehicles contain one or more cross-linking agents which are different from aldehyde condensation resins, and wherein the clear lacquer coating media optionally also contain customary additives for clear lacquers,
    wherein the content of the urea compounds and of the substances which supply formaldehyde is given with respect to resin solids content of the clear lacquer coating media which is formed by the binder vehicles and by reactive thinners which are optionally present and by the crosslinking agents which are optionally present.

2. Clear lacquer coating media containing one or more self-crosslinking or externally crosslinkable binder vehicles, one or more organic solvents, in the case of externally-crosslinkable binder vehicles containing one or more crosslinking agents which are different from aldehyde condensation resins, optionally also containing one or more reactive thinners, and optionally also containing customary additives for clear lacquers, characterised by an additional content of A) 0.1 to 3% by weight one or more urea compounds, and
    B) 0.05 to 10% by weight one or more substances which supply formaldehyde, with respect in each case to the resin solids content of the clear lacquer coating media which is formed by the binder vehicles and by the reactive thinners which are optionally present and by the crosslinking agents which are optionally present.

3. Clear lacquer coating media according to claim 2, characterised in that urea compounds A) are addition products of di- and/or polyisocyanates and mono- and/or polyamines which contain primary and/or secondary amino groups.

4. Clear lacquer coating media according to claim 2, characterised in that the urea compounds are present in crystalline form with particle sizes of 0.1 to 20 μm.

5. Clear lacquer coating media according to claim 2, characterised in that the substance B) which supplies formaldehyde does not supply formaldehyde until the clear lacquer coating medium is stoved.

6. Clear lacquer coating media according to claim 2, characterised in that substances B) which supply formaldehyde are compounds comprising one or more formal groups, hemiformal groups, aminal and/or semiaminal structural units derived from formaldehyde.

7. Clear lacquer coating media according to claim 2, characterised in that they have a resin solids content comprising a) 50 to 100% by weight of one or more binder vehicles,
    b) 0 to 20% by weight of one or more reactive thinners and
    c) 0 to 50% by weight of one or more crosslinking agents which are different from aldehyde condensation resins, wherein the sum of a), b) and c) adds up to 100% by weight and components A) and B) are present in addition to said 100% by weight in amounts of 0.1 to 3% by weight A) and 0.05 to 10% by weight B) with respect to the sum of a), b) and c).

8. A clear lacquer coating medium according to claim 7, characterised in that it contains a) 50 to 90% by weight binder vehicles, b) 0 to 20% by weight reactive thinners and c) 50 to 10% by weight crosslinking agents.

9. Clear lacquer coating media according to claim 2, wherein the urea compounds are solid urea compounds.

10. A method of multi-layer coating by the application of a base lacquer coat and a clear lacquer coat to a substrate which is optionally pre-coated, comprising applying a coating medium according to claim 2 to produce the clear lacquer coat.

11. A method for using the clear lacquer coating media according to claim 2, comprising:

applying the coating media to a substrate for the production of multi-layer coatings.

12. A method for using the clear lacquer coating media according to claim 2, comprising:

applying the coating media to a motor vehicle body part for the production of multi-layer coatings.

* * * * *